United States Patent
Abraham et al.

(10) Patent No.: US 7,603,207 B2
(45) Date of Patent: Oct. 13, 2009

(54) SURROGATE AIR PROCESSOR

(75) Inventors: Michael R Abraham, O'Fallon, MO (US); Brian C Gray, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 764 days.

(21) Appl. No.: 11/120,866

(22) Filed: May 3, 2005

(65) Prior Publication Data
US 2006/0253228 A1    Nov. 9, 2006

(51) Int. Cl.
| | |
|---|---|
| G05D 1/00 | (2006.01) |
| G06G 7/70 | (2006.01) |
| G01C 22/00 | (2006.01) |
| F41G 7/00 | (2006.01) |
| B64G 1/24 | (2006.01) |
| F02K 1/00 | (2006.01) |
| F02K 3/00 | (2006.01) |
| F02K 5/00 | (2006.01) |
| F02K 7/00 | (2006.01) |
| F02K 9/00 | (2006.01) |
| F03H 1/00 | (2006.01) |
| F03H 3/00 | (2006.01) |
| B64C 13/20 | (2006.01) |

(52) U.S. Cl. ............... 701/2; 701/3; 701/4; 701/11; 701/17; 701/23; 701/26; 244/3.14; 244/164; 244/189; 244/190

(58) Field of Classification Search ............... 701/11
See application file for complete search history.

(56) References Cited

U.S. PATENT DOCUMENTS

| | | | |
|---|---|---|---|
| 4,725,956 A * | 2/1988 | Jenkins | 701/2 |
| 5,240,207 A * | 8/1993 | Eiband et al. | 244/190 |
| 6,694,228 B2 * | 2/2004 | Rios | 701/2 |
| 6,778,825 B2 | 8/2004 | Parkman | |
| 6,799,098 B2 * | 9/2004 | Horst et al. | 701/19 |
| 6,975,616 B2 | 12/2005 | Stephenson et al. | |

\* cited by examiner

*Primary Examiner*—Thomas G Black
*Assistant Examiner*—Sze-Hon Kong
(74) *Attorney, Agent, or Firm*—Harness, Dickey & Pierce, P.L.C.

(57) ABSTRACT

A control system for remotely controlling a mobile platform includes a ground-based control station and a surrogate processor. The surrogate processor is remotely located from both the mobile platform and the ground-based control station and includes a communication gateway and software. The communication gateway is in communication with the software, the ground-based control station, and the mobile platform and is capable of transmitting information therebetween. The software generates a control message based on commands received from the ground-based control station to adjust an operational characteristic of the mobile platform. Locating the software and the gateway remotely from the mobile platform also enables a less costly and less complex mobile platform to be constructed.

14 Claims, 2 Drawing Sheets

SURROGATE AIR PROCESSOR

FIELD OF THE INVENTION

The present invention relates to systems and methods for controlling mobile platforms, and more particularly to a control system for remotely controlling various operations of a mobile platform.

BACKGROUND OF THE INVENTION

Mobile platforms such as aircraft, ground vehicles, and watercraft are typically run through a litany of full-scale tests during product development and validation. Such full-scale testing is typically expensive and time consuming as early-production and prototype components are often required to assemble the full-scale mobile platform for testing. Costs are further compounded for mobile platforms such as aircraft and watercraft due to the inherent design complexity and size of such platforms.

A growing area of mobile platform design, and thus, mobile platform testing, relates to so-called "unmanned" mobile platforms capable of being remotely controlled and/or remotely commanded. Such unmanned mobile platforms include unmanned ground vehicles, unmanned water vehicles, and unmanned flying vehicles. The unmanned mobile platforms may be used in a military application for surveillance and/or as a weapon and may also be used in a non-military application for inspection of dangerous and/or hard-to-reach places such as pipelines, forest fires, and power plants. Such mobile platforms are typically capable of being remotely controlled/commanded and are responsive to instructions from a remotely-located control station.

Coordination between the control station and the unmanned mobile platform is typically established via wireless communication. Control commands are generally input at the control station and wirelessly communicated to the mobile platform to control operation thereof. Communication between the control station and the mobile platform, as well as validation of control software and processing circuitry incorporated into the mobile platform, is accomplished during design and testing of the mobile platform, control software, and processing circuitry.

A conventional full-scale test for an unmanned mobile platform, such as an unmanned ground vehicle or an unmanned air vehicle, typically requires a full-scale, fully operational, mobile platform. The mobile platform is usually remotely controlled by the control station to allow test engineers and the like to direct operation of the mobile platform during testing. The mobile platform is conventionally a full-scale test specimen, fully equipped with processing circuitry and control software. Test engineers are therefore able to validate not only the mobile platform, but the processing circuitry and control software as well.

Manufacturers of mobile platforms, unmanned or otherwise, usually combine actual full-scale testing with laboratory testing, simulation, and reduced-scale testing (i.e., model testing) to mitigate the cost of product development and validation testing. For example, manufacturers of mobile platforms often use reduced-scale models for wind tunnel testing and design development. The reduction in scale allows manufactures to use smaller test facilities (e.g., smaller wind tunnels) and allows for review of an outer surface without requiring a full-scale model.

Full-scale performance testing of unmanned mobile platforms is often problematic as expensive and complex processing circuitry and control software, capable of receiving and processing commands from a central control station, must be located on the mobile platform during testing. The full-scale platform translates into a larger vehicle (i.e., air or ground vehicle) and, thus, increases the cost and complexity of the test. Furthermore, should the full-scale unmanned mobile platform experience difficulty during testing and become damaged, the expensive processing circuitry and software carried by the mobile platform is likely to become damaged or destroyed.

SUMMARY OF THE INVENTION

A control system for a mobile platform includes a ground-based control station and a surrogate processor. The surrogate processor is remotely located from the mobile platform and the ground-based control station and includes a communication gateway and software. The communication gateway is in communication with the software, the ground-based control station, and the mobile platform and is capable of transmitting information therebetween. The software generates control messages based on commands received from the ground-based control station and/or mobile platform operational state data to adjust an operational characteristic of the mobile platform.

In one specific embodiment, the control system is used to control operation of a reduced-scale, unmanned flying vehicle during development of a corresponding full-scale, unmanned flying vehicle. The control system positions the surrogate processor remotely from both the control station and the reduced-scale, unmanned flying vehicle and provides for communication therebetween. The surrogate processor includes developmental control software and hardware (i.e., processing circuitry) that is representative of the actual control software and hardware to be used on the corresponding full-scale, unmanned flying vehicle.

The control station and unmanned flying vehicle function as if the control software and hardware are actually disposed on the reduced-scale unmanned flying vehicle. As such, the control system allows engineers to test and validate the developmental software and hardware without having to use a large, unmanned flying vehicle capable of carrying the control software and hardware. The use of the reduced-scale, unmanned flying vehicle during development results in a reduction in the complexity and cost of the particular test, and protects the control software and hardware under development.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

With reference to the figures, a control system 10 for a mobile platform is provided and includes a control station 12 and a surrogate processor subsystem 14. The surrogate processor subsystem 14 is remotely located from both the mobile platform and the control station 12 and controls operation of the mobile platform based on inputs received from the control station 12 and/or inputs from the UAV 16.

Figure 1:
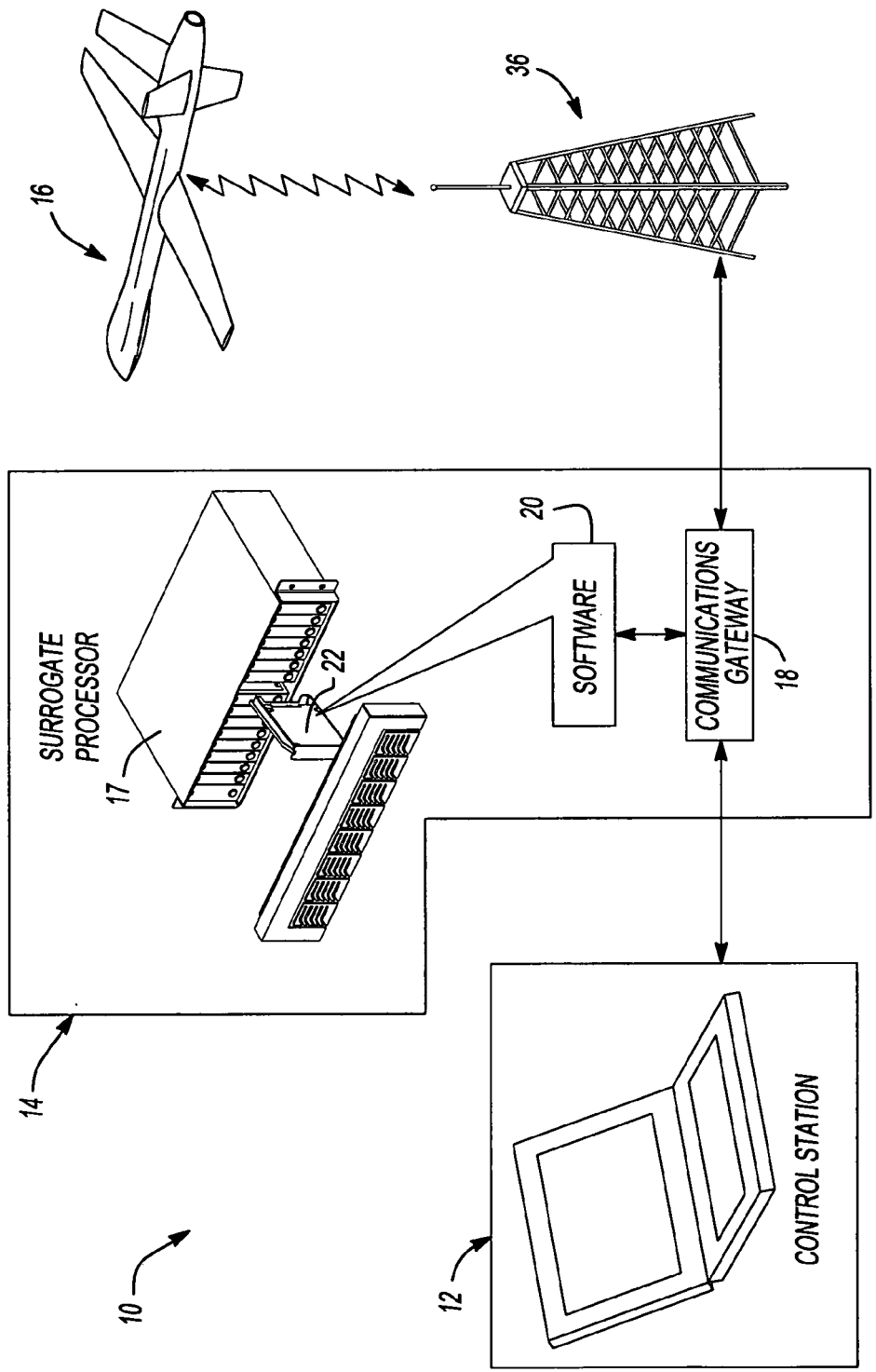
FIG. 1 is a schematic representation of a control system for a mobile platform in accordance with the present invention.

With reference to FIG. 1, the mobile platform is shown as a reduced-scale unmanned air vehicle (UAV) 16 capable of being controlled/commanded remotely from the ground. The UAV 16 is representative of a larger, full-scale UAV and is therefore considered a "reduced-scale" UAV. The reduced-scale UAV 16 is used during testing and validation of the full-scale UAV to reduce costs associated with testing and to mitigate component damage should the UAV 16 experience a malfunction during testing.

It should be understood that while the control system 10 of the present invention will be described hereinafter and in the drawings as associated with a reduced-scale UAV 16, that the control system 10 of the present invention may similarly be used to control other unmanned mobile platforms such as, but not limited to, mobile ground and marine vehicles, as well as rotorcraft. Furthermore, it should be understood that the control system 10 of the present invention may also be used to remotely control various functions of conventional mobile platforms such as ground based vehicles, aircraft, land rotorcraft, and watercraft. Remote control/command of such mobile platforms is especially desirable during testing and validation, but may also be applicable once the mobile platform is placed in service to perform its mission or intended service.

With reference to FIG. 1, the surrogate processor subsystem 14 includes a surrogate processor 17, a communications gateway 18, and control software 20. The communications gateway 18 is in communication with the UAV 16, the control station 12, and the control software 20 and transmits information therebetween. The control software 20 may include mission software capable of directing the UAV 16 during operation, based on instructions received from the control station 12 via the communications gateway 18 and/or UAV 16 operational state data through the communication system 36.

The communications gateway 18 and control software 20 are "embedded" in the surrogate processor subsystem 14 and operate in conjunction with embedded processors and an embedded operating system (represented by reference numeral 22 in FIG. 1) that cooperate to control operation of the UAV 16. In operation, the communications gateway 18 receives output signals from the control station 12 and the UAV 16. The processor 17 receives the output signals as an input and processes the signals using control software 20, and outputs control messages or commands. The control messages or commands are relayed to the UAV 16 via the communications gateway 18 to control operation of the UAV 16.

The communications gateway 18 and control software 20 are described as "embedded," as the communications gateway 18 and control software 20 communicate with the UAV 16 and the ground station 12 as if the communications gateway 18 and software 20 were actually installed on the UAV 16. In other words, the control station 12 and UAV 16 each operate as if the communications gateway 18 and control software 20 are actually disposed on the UAV 16. Therefore, the surrogate processor subsystem 14 is considered to be "embedded" between the control station 12 and the UAV 16.

Remotely locating the communications gateway 18 and software 20 from the UAV 16 allows the UAV 16 to be tested without risking loss of the costly hardware and software associated with the communications gateway 18 and software 20 should a malfunction occur during testing. This also allows for a less expensive UAV that can be used for test. Furthermore, the communications gateway 18 and software 20 are representative of the actual hardware and software that will be used on the full-scale UAV and can therefore be implemented on a full-scale UAV to validate test results once testing on the reduced-scale UAV 16 is complete.

Figure 2:
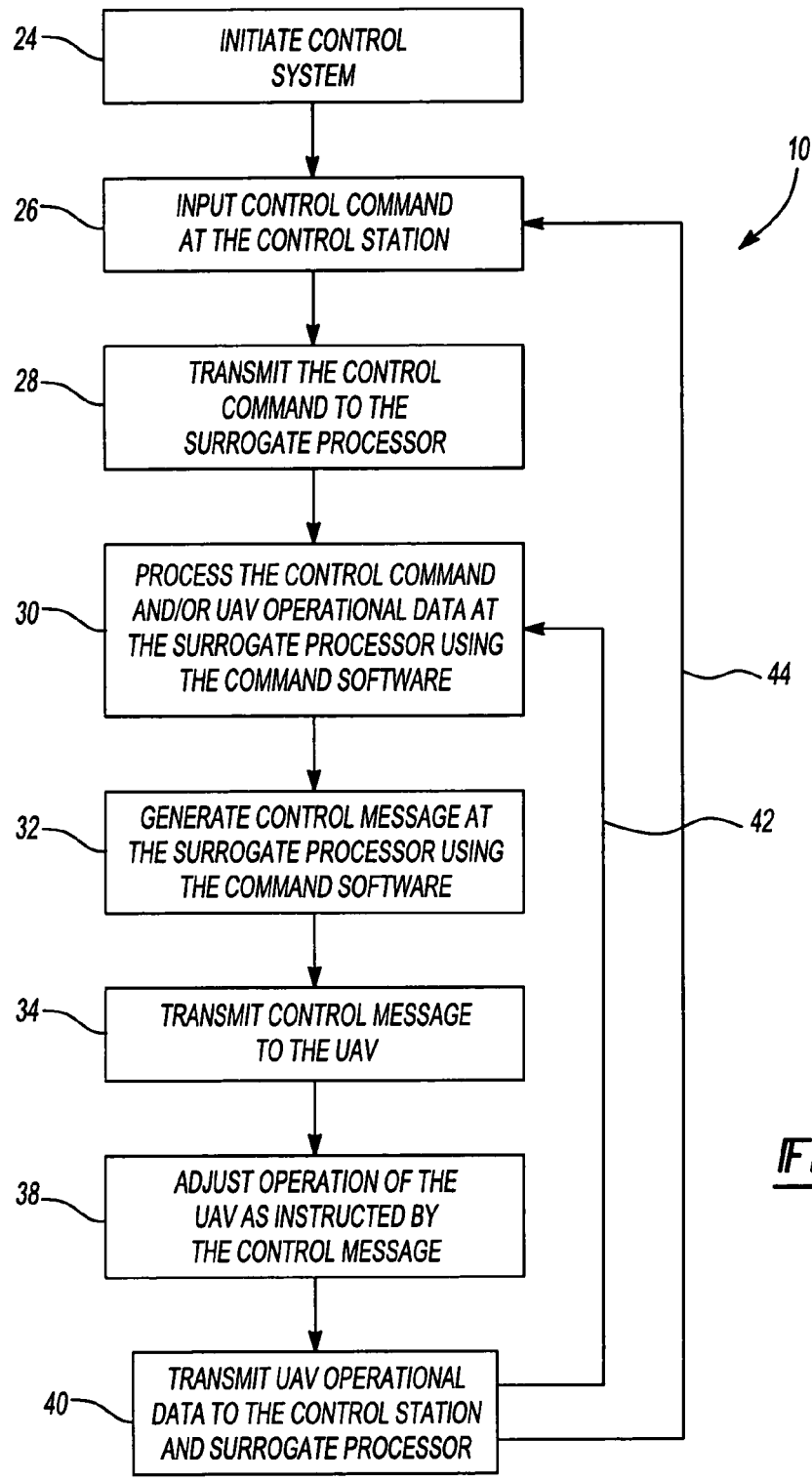
FIG. 2 is a flow chart of the operations performed by the control system of FIG. 1.

With reference to FIG. 2, operation of the control system 10 will be described in detail. The control system 10 is initiated at operation 24 to begin control of the UAV 16. A test engineer, or other operator, inputs a control command into the control station 12 at operation 26 to begin operation of the UAV 16. For example, when the UAV 16 initially takes flight, a test engineer may input coordinates or other flight instructions to direct the flight of the UAV 16.

The control command is wirelessly transmitted to the surrogate processor subsystem 14 at operation 28 for processing. It should be understood that while wireless transmission is disclosed, wired communication may also be used and should be considered as part of the present invention.

The control command is transmitted to the surrogate processor subsystem 14 via the communications gateway 18. Upon receipt, the communications gateway 18 transmits the control command to the command software 20 for processing. The surrogate processor 17 processes the control command and/or UAV 16 state data using the command software 20 at operation 30 to generate a control message at operation 32. The control message is transmitted from the control software 20 to the communications gateway 18 for transmission to the UAV 16

Once the control message is received by the communications gateway 18, the control message is transmitted to the UAV 16 at operation 34. Transmission of the control message may be accomplished by any suitable device such as by way of wired or wireless telemetry, such as by a suitable antenna 36 (FIG. 1) in communication with both the communications gateway 18 and the UAV 16.

In either event, once the UAV 16 receives the control message, operation of the UAV 16 is adjusted according to the control message received at operation 38. For example, if the control command input at the control station 12 relates to positioning of the UAV 16, the control message directed to the UAV 16 will adjust at least one of the speed and direction of the UAV 16 to properly direct the UAV 16 along a desired flight path. It should be understood that while the foregoing example has described the control message as being related to controlling a flight path of the UAV 16, that the control message may also be used to control other aspects of the UAV 16, such as, but not limited to, a camera, a control arm, a weapon, an entry door, and landing gear. Generally speaking, such control functions will be largely dependent on the specific type of mobile platform with which the present invention is being used, as well as the particular mission that the control software 20 is being used to control.

Once operational characteristics of the UAV 16 have been changed in accordance with the control message, operational data relating to the UAV 16 is then transmitted back to the surrogate processor 14 for further processing at operation 42. In addition, UAV operational data may also be transmitted to the control station 12 for monitoring and processing at operation 44. The control station 12 may use the UAV operational data to generate another control command and the above described operational sequence is repeated. Furthermore, the UAV operational data may initiate the control software 20 to generate a new command at operation 30 without an input from the control station 12. It should be understood that the control system 10 may be configured such that the UAV operational data is only sent to one of the control station 12 (i.e., operation 44) and the surrogate processor (i.e., operation 42) or, alternatively, that that the UAV operational data is sent to both the control station 12 and the surrogate processor 14.

If the operational data is transmitted to both the control station 12 and surrogate processor 14, inputs from the control station 12 may override processing of the UAV operational data at operation 30 by the surrogate processor 14. For example, if the UAV 16 is off course, operational data indicating the position of the UAV 16 may be transmitted to both the control station 12 and the surrogate processor 14. The surrogate processor 14 may process such data and attempt to correct the position of the UAV 16 and continue the flight. However, the control station 12 may process the data and determine that the UAV 16 is too far off course and require the UAV 16 to land. Under such a scenario, the control command sent to the surrogate processor 14 at operation 28 overrides the surrogate processor 14 and the UAV 16 will be remotely landed under the direction of the control station 12.

The foregoing process may be continuously run such that operational data from the UAV 16 is continuously processed in real time by the control station 12. For example, the control software 20 being tested may relate to controlling a position of the UAV 16 during flight. Under such circumstances, the UAV 16 continually supplies a stream of real time positional data to the surrogate processor subsystem 14 for processing. Once the surrogate processor subsystem 14 process the data, the information is then transmitted to the control station 12 for possible control.

The control system 10 of the present invention allows test engineers and the like to test and validate control software for a mobile platform without risking loss of the control software and/or associated processors by remotely locating the control software and processors from the mobile platform during testing. In so doing, the control system 10 allows use of a reduced-scale mobile platform during testing, and thus significantly reduces the complexity and cost of the particular test, as well as the cost of the mobile platform itself.

While various preferred embodiments have been described, those skilled in the art will recognize modifications or variations, which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for controlling operation of a mobile platform, comprising:
   providing a mobile platform having at least one operating component for controlling said mobile platform, and adapted to wirelessly receive information and to wirelessly transmit information;
   locating a control station remotely from said mobile platform;
   locating a surrogate processor remotely from said control station and said mobile platform;
   communicating information from said control station to said surrogate processor;
   processing said information from said control station at said surrogate processor and outputting a control message;
   communicating said control message to said mobile platform to remotely control/command operation of said mobile platform;
   providing said mobile platform with at least one mission-specific device that is at least one of a camera, a control arm, a weapon, an entry door, and a landing gear;
   wherein said communicating information to said surrogate processor includes communicating instructional information for controlling said mission-specific device; and
   using said surrogate processor to generate a subsequent control message in response to wirelessly received operational information from the mobile platform, independent of the control station.

2. The method of claim 1, further comprising providing said surrogate processor with software capable of controlling said mobile platform based on information received from said control station and/or mobile platform.

3. The method of claim 1, further comprising providing said surrogate processor with a communication gateway capable of communicating with said mobile platform and communicating with said control station.

4. The method of claim 1, wherein said communicating information to said surrogate processor includes communicating positional information for controlling a direction of travel of said mobile platform.

5. The method of claim 1, wherein communicating said control message to said mobile platform includes adjusting said operational component of said mobile platform for controlling a direction of travel of said mobile platform.

6. The method of claim 1, wherein communicating said control message to said mobile platform includes adjusting said mission-specific device of said mobile platform.

7. The method of claim 1, wherein said locating said surrogate processor includes positioning said surrogate processor on the ground.

8. A method for controlling operation of a mobile platform, comprising:
   providing a mobile platform having at least one operating component for controlling a direction of travel of said mobile platform;
   locating a ground-based control station remotely from said mobile platform;
   locating a surrogate processor remotely from said ground-based control station and said mobile platform, and providing the surrogate processor with control software responsive to the surrogate processor;
   communicating first instructional information from said ground-based control station to said surrogate processor;
   processing said first instructional information from said ground-based control station at said surrogate processor and outputting a first control message;
   communicating said first control message to said operating component of said mobile platform to remotely control/command a direction of travel of said mobile platform;
   providing said mobile platform with at least one mission-specific device that is at least one of a camera, a control arm, a weapon, an entry door, and landing gear;
   further comprising communicating a second instructional information from said ground-based control station to said surrogate processor for controlling said mission-specific device; and
   communicating said second control message from said surrogate processor to said mobile platform to adjust said mission-specific device of said mobile platform;
   using the surrogate processor to independently, automatically generate subsequent control messages in response to wirelessly received operational information from the mobile platform;

using the control station to monitor the wirelessly received operation information from the mobile platform; and using the control station to override generation of the automatically generated subsequent control messages when a predetermined operating condition of the mobile platform is occurring.

9. The method of claim 8, further comprising providing said surrogate processor with software capable of controlling said mobile platform based on information received from said ground-based control station.

10. The method of claim 8, further comprising providing said surrogate processor with a communication gateway capable of communicating with said mobile platform and communicating with said ground-based control station.

11. The method of claim 8, wherein said communicating first instructional information to said surrogate processor includes communicating positional information for controlling a direction of travel of said mobile platform.

12. The method of claim 8, wherein said locating said surrogate processor includes positioning said surrogate processor on the ground.

13. A control system for a mobile platform comprising:
a ground-based control station; and
a surrogate processor remotely located from the mobile platform and said ground-based control station, said surrogate processor including:

a communication gateway in communication with said ground-based control station and said surrogate processor; and a software module operable to generate a control message based on commands received from said ground-based control station to remotely adjust an operational characteristic of the mobile platform;

said mobile platform including at least one mission-specific device that is at least one of a camera, a control arm, a weapon, an entry door, and a landing gear;

said mission-specific device controlled by said surrogate processor based on instructions from said ground-based control station;

said surrogate processor adapted to automatically generate a subsequent control message upon receipt of a wireless signal from the mobile platform; and the ground-based control system adapted to override the automatic generation of the subsequent control message when a predetermined operating condition exists with the mobile platform.

14. The control system of claim 13, further comprising an antenna operable to transmit messages between the mobile platform and said communication gateway.

* * * * *